D. SCHOONMAKER.

Assignor to H. C. MAXWELL.

CHECK REIN SPREAD AND ATTACHMENT.

No. 10,110. Reissued May 9, 1882.

WITNESSES—

Com L. Raymond.

C. H. Duell

INVENTOR—

Daniel Schoonmaker per Duell, Lass & Hay his Attorneys

N. PETERS, Photo-Lithographer, Washington, D. C.

UNITED STATES PATENT OFFICE.

DANIEL SCHOONMAKER, OF NEWARK, NEW JERSEY, ASSIGNOR TO HENRY C. MAXWELL, OF ROME, NEW YORK.

CHECK-REIN SPREAD AND ATTACHMENT.

SPECIFICATION forming part of Reissued Letters Patent No. 10,110, dated May 9, 1882.

Original No. 188,546, dated March 20, 1877. Application for reissue filed February 23, 1882.

*To all whom it may concern:*

Be it known that I, DANIEL SCHOONMAKER, of Newark, county of Essex, and State of New Jersey, have invented a new and Improved Check-Rein Spread and Saddle-Bolt, of which the following is a specification.

Figure 1:
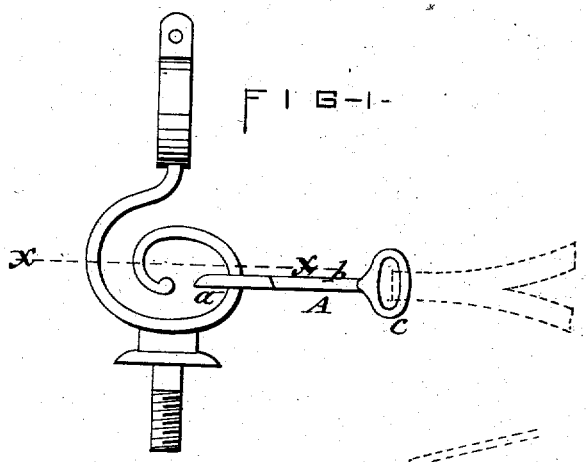
Figure 2:
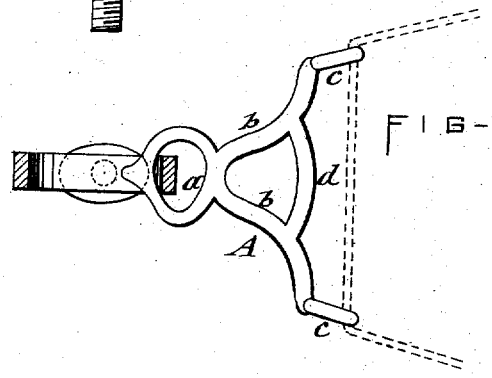
Figure 3:
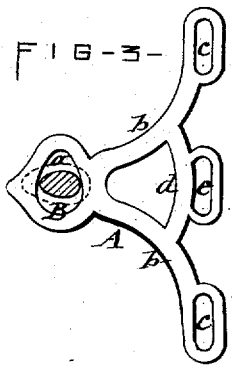
Figure 4:
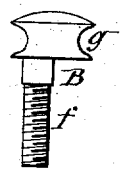
Figure 5:
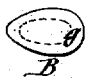

Figure 1 is a side view of my check-rein spread connected with the water-hook of a harness. Fig. 2 is a section on line *x x* in Fig. 1. Fig. 3 is a top view of the rein-spread attached to a saddle-bolt. Figs. 4 and 5 are side and top views, respectively, of the saddle-bolt.

Similar letters of reference indicate corresponding parts.

My invention consists of a rein-spread formed in one piece of cast metal, which is attached to the ends of the check-rein straps, or is provided with loops running transversely to its body, in which case the strap may be continuous from one end of the bit to the other, simply passing through the loop of the spread. The spread is of such form as to be readily placed on or removed from the water-hook.

My invention further consists in a bolt having a head of peculiar form to be applied to the saddle to be used in place of the usual water-hook in connection with the rein-spread.

A is a rein-spread consisting of a casting having an oval eye, *a*, from which diverge the curved arms *b*, having at their outer ends eyes *c*, which are arranged in the same plane as the arms *b*, as in Fig. 3, or transversely, as in Figs. 1 and 2. The arms *b* are connected, near their centers, by an arc-shaped brace, *d*, to which a loop, *e*, may be attached for receiving a single check-rein passing over the top of the head and neck. When the eyes *c* are arranged transversely or in a vertical plane, as in Figs. 1 and 2, the check-rein passes through both eyes, as shown by the dotted lines, and may adjust itself to the position of the horse's head.

B in Figs. 4 and 5 represents a bolt to be attached to a harness-saddle, and adapted to receive the rein-spread, said bolt consisting of a threaded shank, *f*, having an oval head, *g*, attached to it eccentrically, and grooved or cored out to retain the rein-spread.

The rein-spread is placed upon the saddle-bolt by slipping the oval eye *a* over the oval head of the bolt, and giving it a quarter-turn, bringing it into the position shown in Fig. 3. The rein-spread may be finished by plating it with nickel or silver, or by coating it with rubber or celluloid.

I do not confine myself to the exact form shown in the drawings, and described herein, as it may be varied to suit the tastes of the manufacturer or purchasers.

The object of spreading the check-rein is to remove the same from contact with the horse's neck and mane, and to permit the latter to be placed inside the rein without being pressed close to the neck.

Having thus fully described my invention, what I claim as new, and desire to secure by Letters Patent, is—

1. A check-rein spread having the eye *a*, divergent arms *b b*, and the eyes *c c* on the free end of said arms, all formed in one piece of cast metal, substantially as described and shown.

2. The combination, with the curved divergent arms *b b*, each provided with the eye *c* for the reception of the check-rein, as shown, of the brace *d*, as and for the purpose set forth.

3. As an improved article of manufacture, the check-rein spread A, composed of the oval eye *a*, curved arms *b*, the eyes *c c*, arc-shaped brace *d*, and loop *e*, substantially as shown and described.

4. The combination of the check-rein spread A and saddle-bolt B, having the oval grooved head *g*, substantially as shown and described.

In testimony whereof I have hereunto set my hand in presence of two attesting witnesses.

DANIEL SCHOONMAKER.

Witnesses:
E. N. MILLER,
WM. C. MILLER.